June 3, 1958  C. S. BAILEY  2,837,284
AUTOMOBILE RADIATOR THERMOSTAT
Filed Sept. 27, 1954

INVENTOR
Charles S. Bailey
BY C. H. Dibbe
ATTORNEY

United States Patent Office 2,837,284
Patented June 3, 1958

2,837,284

AUTOMOBILE RADIATOR THERMOSTAT

Charles S. Bailey, Lockport, N. Y., assignor to General Motors Corporation, Detroit, Mich., a corporation of Delaware Application September 27, 1954, Serial No. 458,443

2 Claims. (Cl. 236—34)

This invention relates to thermostats and more particularly to such devices which include valves and bellows for controlling the flow of fluids in accordance with the temperatures of such fluids.

Bellows-type thermostats are used extensively in the operation of fluid system valves. An example is in the control of coolant in automotive radiators and jackets of internal combustion engines. The thermostats are immersed in the coolant and are subjected to changing conditions of temperature and pressure so that vibration of the thermostat often causes inefficient operation and sometimes fatigue of the thin sheet metal materials utilized in the thermostat construction.

An object of the present invention is to provide an improved thermostat of the bellows type in which vibration is minimized.

A further object is to provide an improved thermostat which is simple in construction, economical to manufacture in large quantities, is highly efficient in operation, and characterized by long life.

A feature of the invention comprises a bellows having relatively moving heads to one of which a cup-shaped member is attached with an opening in the member communicating with an expansible fluid enclosed within the bellows.

These and other important features of the invention will now be described in detail in the specification and then pointed out more particularly in the appended claims.

Figure 1:
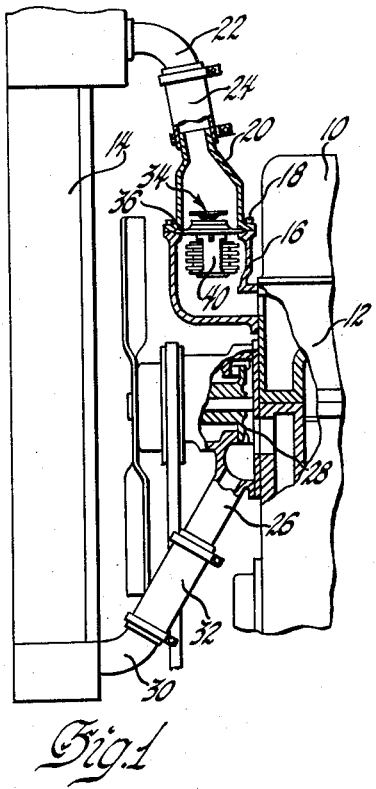
Fig. 1 is a side elevational view of a radiator and front end of an engine of a motor vehicle with parts broken away more clearly to show features of the circulating system and including a thermostat as an embodiment of the present invention.

Referring to the drawings and specifically to Fig. 1, an internal combustion engine 10 for a vehicle is provided with a jacket 12 defining a coolant chamber and associated with the engine is the usual radiator 14. An upper and forward end of the engine is provided with a fitting 16 communicating with the water jacket and which has secured thereto by machine screws 18 a second fitting 20 which in turn is connected to an inlet pipe 22 of the radiator 14 by means of a flexible pipe connection 24. A fitting 26 extending from a coolant circulating pump 28 is connected to the radiator outlet pipe connection 30 by a second flexible conduit or connection 32. A thermostatically controlled valve 34 is mounted within the fittings 16 and 20 and serves to control the flow of fluid coolant from the engines 10 to the radiator 14. This valve structure bears a marginal flange 36 which is adapted to be clamped in fluid tight relation between the abutting portions of the fittings 16 and 20.

Figure 2:
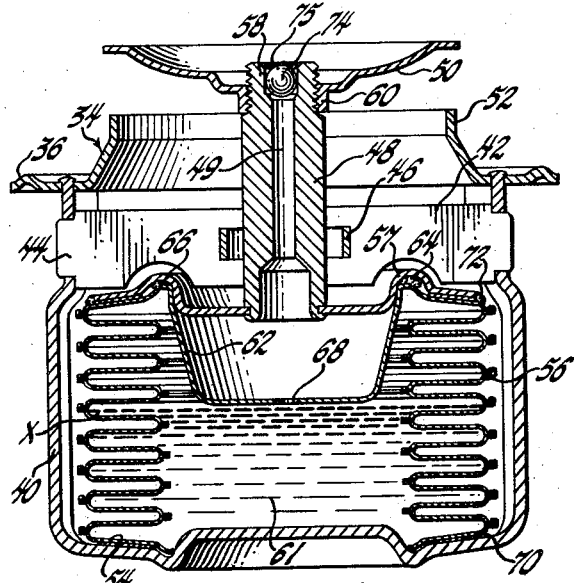
Fig. 2 is an enlarged axial and sectional view taken through a thermostat as depicted in Fig. 1 and showing the arrangement of the parts when the associated valve is in the open position.
Figure 3:
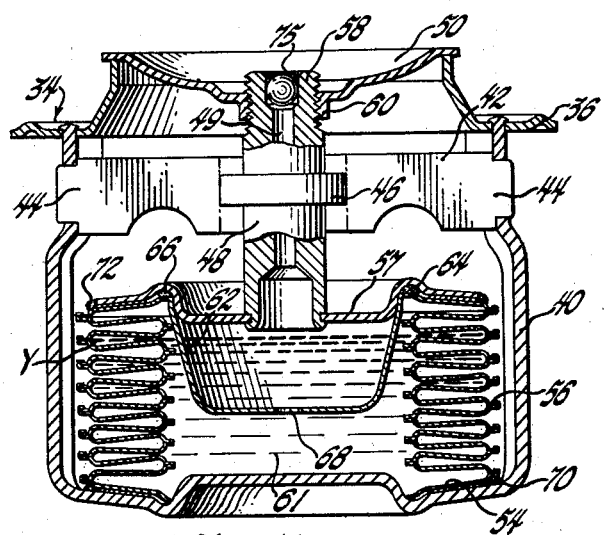
Fig. 3 is a view similar to that of Fig. 2 showing the thermostat contracted and the associated valve actuated to fully closed position.

In Figs. 2 and 3 the valve 34 is shown to comprise a fixed supporting frame made up of the annular flange 36, a substantially U-shaped frame portion 40 secured to flange 36 and a bracket 42 which is provided near the upper end of the frame portion 40. Bracket 42 comprises a narrow flat plate having a reduced portion 44 at each end thereof and these portions extend through slots provided in the side members of the frame portion 40. Bracket 42 is further secured against movement by staking and it is slitted longitudinally to form a narrow strip 46. This strip is bent outwardly and the parallel portions of the bracket 42 are also bent outwardly but in the opposite direction thereby forming a vertical guide opening through which a valve stem 48 extends. The stem supports at its upper end a valve element 50, the margin of which is adapted to seat against an annular flange or seat 52 which is integral with the supporting flange 36.

The frame portion 40 is arranged to support in fixed relation therein a head 54 of a bellows 56.

The upper end of the bellows is provided with a movable head 57 to which the lower end of the tubular valve stem 48 is secured. An axial passage 49 is provided in the stem. The upper end 58 of the stem is provided with external threads engaging the lower internally threaded portion 60 of the valve element 50. The latter is of dished construction and is shown in its closed position in Fig. 3. This position is assumed when the thermostatic element or bellows 56 is in its contracted position. Upon an increase in the coolant temperature of a circulatory system the bellows may expand to the position shown in Fig. 2 thereby moving the valve 50 from its seat. This permits circulation of the coolant between the water jacket 12 and the radiator 14 in the system of Fig. 1.

The thermostat bellows 56 is partially filled with an expansible liquid 61 of suitable composition and an inverted cup-shaped member 62 bears an annular flange 64 which is soldered at 66 to the movable head 57 in such a way as to cooperate with the latter and the frame 40 and to define two coaxial chambers. The bottom of the member 62 forms a membrane transverse to the axis of the bellows and is provided with an opening or orifice 68. The bellows 56 is soldered as at 70 and 72 to the frame portion 40 and the movable head 57, respectively.

In assembling the construction the member 62 is not press-fitted into its position with respect to the movable head 56 but is dropped in place and fits loosely thereon. The member is subsequently soldered in its position when the bellows 56 is soldered to the header 57.

When the bellows 56 is open, a measured amount of expansible fluid 61 is placed therein and this amount is sufficient for the fluid to reach the level X as shown by dotted line in Fig. 2. The unit is then chilled, evacuated and sealed by the insertion of a ball 74 and the use of solder or some other suitable sealing material 75.

When the temperature of the coolant in the jacket 12 increases, the collant contacts and heats the bellows 56 with the result that the expansible fluid 61 increases in volume and partially by vaporization. The bellows, therefore, expands and lifts the valve 50 from its seat 52.

In order to minimize vibration in the bellows the cup member 62 acts as a dash pot because of the orifice 68. Resistance to the flow of fluid through the orifice 68 gives a snubbing action which depends upon liquid being inside as well as outside the cup during the first opening or final closing movement of the valve. In automotive installations vibration forces must be combatted principally during the first slight opening motion of the valve. This slight motion is generally in the nature of ⅛ to ¼ inch of valve lift. When the valve is more fully opened, there is not sufficient differential in pressure between the opposite sides of the valve to cause any objectional vibration. It will be seen in Fig. 3 that the liquid level both inside and outside of the cup member 62 is slightly higher or at line Y when the valve is closed. In Fig. 2 with the valve fully opened, no liquid is present in the cup 62 but this condition is not essential.

There are several advantages in this novel construction. The first advantage is that the parts may easily be assembled. A second advantage is that the bellows 56, when proven defective by test, may be replaced easily as the bellows and cup members 62 may be removed by the application of heat to unsweat the joints at 66, 70 and 72. Another advantage is that the provision for eliminating vibration has no restrictive or limiting effect on the range of valve travel—i. e.—the dash pot feature does not constitute a stop for the valve.

I claim:

1. A thermostat including a frame with one end in the form of a flanged element for supporting the thermostat in a conduit, said one end also presenting a valve seat defining an opening, the other end of said frame being joined to said one end by spaced portions of the frame whereby a flow passage for fluid to pass through said conduit extends through the frame by way of said opening, an expansible and contractable bellows with one head at one end of the bellows being movable, a valve element outside said bellows and frame and slidably mounted with respect to the latter to engage said seat and being rigidly fixed to said one movable head, the other end of said bellows being fixed to and closed by said other end of said frame, an expansible liquid confined in said bellows, a cup-shaped member with its margin fixed to one end of said bellows and including a membrane lying in a plane transverse to the axis of said bellows to divide the interior of the latter into two chambers, and said membrane having a clear opening through which said liquid may flow from one of said chambers to the other when said bellows is subjected to a variation in temperature of said fluid.

2. A thermostat as set forth in claim 1 in which the joinder of the margin of the cup-shaped member and the valve element to the bellows is by fusible metal thereby facilitating replacement of the bellows with respect to the frame.

References Cited in the file of this patent
UNITED STATES PATENTS

| | | |
|---|---|---|
| 1,561,118 | Smith | Nov. 10, 1925 |
| 2,376,711 | Mock | May 22, 1945 |
| 2,469,038 | Winkler | May 3, 1949 |

FOREIGN PATENTS

| | | |
|---|---|---|
| 428,895 | Great Britain | May 21, 1935 |
| 706,386 | Great Britain | Mar. 31, 1954 |